United States Patent
Randall

(10) Patent No.: US 9,228,058 B2
(45) Date of Patent: Jan. 5, 2016

(54) COMFORT APPARATUS AND METHOD OF MANUFACTURE

(71) Applicant: Randall Surgical Corporation, Memphis, TN (US)

(72) Inventor: Michael Ray Randall, Greenville, SC (US)

(73) Assignee: EcoSurg, Memphis, TN (US)

( * ) Notice: Subject to any disclaimer, the term of this patent is extended or adjusted under 35 U.S.C. 154(b) by 0 days.

(21) Appl. No.: 13/832,675

(22) Filed: Mar. 15, 2013

(65) Prior Publication Data

US 2014/0275309 A1    Sep. 18, 2014

(51) Int. Cl.
| | |
|---|---|
| *C08G 18/00* | (2006.01) |
| *C08G 71/04* | (2006.01) |
| *C08G 18/76* | (2006.01) |
| *C08G 18/36* | (2006.01) |
| C08G 63/02 | (2006.01) |
| C08G 101/00 | (2006.01) |

(52) U.S. Cl.
CPC .............. *C08G 71/04* (2013.01); *C08G 18/36* (2013.01); *C08G 18/7621* (2013.01); *C08G 18/7671* (2013.01); *C08G 2101/0008* (2013.01); *C08G 2101/0025* (2013.01); *C08G 2350/00* (2013.01)

(58) Field of Classification Search
CPC .... C08J 9/0066; C08J 9/0061; C08J 2375/04; C08G 18/242
USPC ........... 521/91, 102, 107, 117, 121, 131, 137, 521/155; 528/44, 60, 73, 80, 271, 272
See application file for complete search history.

(56) References Cited

U.S. PATENT DOCUMENTS

| | | | |
|---|---|---|---|
| 3,746,667 A | 7/1973 | Dieter et al. | |
| 4,713,399 A | 12/1987 | Webb | |
| 5,900,442 A | 5/1999 | Leenslag | |
| 6,190,487 B1 | 2/2001 | Laughlin | |
| 6,399,698 B1 | 6/2002 | Petrovic | |
| 6,625,831 B2 | 9/2003 | Laughlin | |
| 7,045,577 B2 * | 5/2006 | Wilkes et al. | .............. 525/327.3 |
| 7,674,925 B2 | 3/2010 | Garrett et al. | |
| 7,786,239 B2 | 8/2010 | Petrovic et al. | |
| 8,143,346 B2 | 3/2012 | Diakoumakos et al. | |
| 8,153,746 B2 | 4/2012 | Petrovic et al. | |
| 8,236,866 B2 | 8/2012 | Casati et al. | |
| 2012/0149842 A1 | 6/2012 | Diakoumakos et al. | |

FOREIGN PATENT DOCUMENTS

EP    2288636 B1    12/2012

OTHER PUBLICATIONS

Kathalewar, Mukesh S. et al., "Non-isocyanate polyurethanes: from chemistry to applications," RSC Advances, 2013, 3, pp. 4110-4129.
Diakoumakos, Constantinos D. et al, "Non-isocyanate-based polyurethanes derived upon the reaction of amines with cyclocarbonate resins", Macromolecular Symposia, 2004, vol. 216, No. 1, pp. 37-46.
General Heathcare, "Performance Comfortrm Foam Positioners", General Heathcare, 6615 375th Avenue, Burlington, WI 53105 (Feb. 1, 2012) (printed from www.archive.org).

* cited by examiner

*Primary Examiner* — Terressa Boykin
(74) *Attorney, Agent, or Firm* — Technology Legal Counsel LLC

(57) ABSTRACT

An article of manufacture formed from the reaction product of at least one plant based polyol and at least one isocyanate free monomer, comprising a foam structure having wide commercial applicability.

20 Claims, 3 Drawing Sheets

COMFORT APPARATUS AND METHOD OF MANUFACTURE

BACKGROUND

This technology relates generally to plant based foam production and, more particularly, to cushioning composed at least in part of plant based materials.

In consumer products designed for comfort such as mattresses, seat cushions, etc. a wide range of materials have been used to ensure the appropriate balance between support and comfort. In particular, various types of foams have been used in the commercial production of car seats, bedding and the like. The foam produced for these applications is typically manufactured from carcinogenic petroleum based materials that can have an adverse impact on the environment and the user. Two component polyurethanes comprised of isocyanate-hydroxyl chemistry and petroleum polyols are widely used because these conventional polyurethanes possess high elasticity, abrasion resistance and other outstanding properties. Due to the toxicity of isocyanates, which are synthesized from an even more toxic phosgene predecessor, exposure to isocyanates can result in health effects, such as skin irritation and long-term asthma. This can lead to unintended consequences as the resulting foam is incorporated into crib mattresses and other consumer and industrial products.

BRIEF SUMMARY

Natural oil based materials are disclosed that include polyols and pre-polymers derived from plant based sources. In addition to (in order to reduce the isocyanate content) or in lieu of isocyanate, natural oil based electrophiles are disclosed such as glycerides.

Triglycerides, such as:

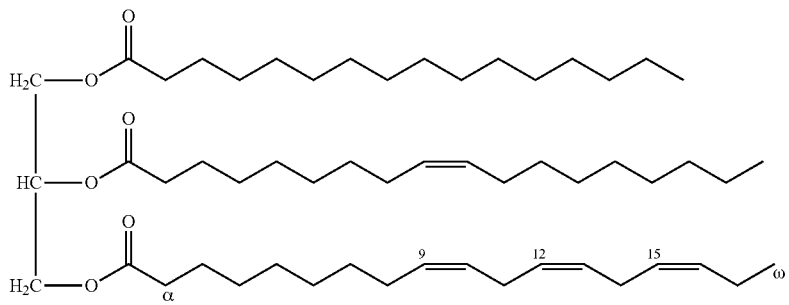 [SMILES: CC/C=C\C/C=C\C/C=C\CCCCCCCC(=O)OCC(COC(=O)CCCCCCCCCCCCCCC)OC(=O)CCCCCCC/C=C\CCCCCCCC]

are the main constituents of vegetable oil (typically more unsaturated) and are readily converted to usable electrophiles.

Treatment of vegetable oils with peroxy acids gives epoxides which can be reacted with nucleophiles to give hydroxyl groups. This can be done as a one-step process. For example plant-based epoxides can be obtained on an industrial scale from soybean, safflower, linseed, chickpea oil. In this context, the so-called Prilezhaef reaction may be used, in which the olefinic double bonds of the unsaturated fatty acids are oxidized by peracid to epoxides (oxiranes). The peracid formation takes place via a chemical process, frequently in situ, based on reaction of hydrogen peroxide with acetic or formic acid using stronger mineral acids or ion exchange resins as the catalyst.

Epoxides can be used to formulate organocarbonates (e.g., dimethyl carbonate, cyclic compounds ethylene carbonate and propylene carbonate), which are suitable alternatives to isocyanates in two part polyurethane production.

Plant based polyol products are disclosed that are characterized by an unreacted double bond suitable for use in two part polyurethane production.

Foam production from plant based components for broad commercial uses. Disclosed is a foam which is the reaction product of at least one natural oil based polyol and at least one natural oil based resin.

These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1:
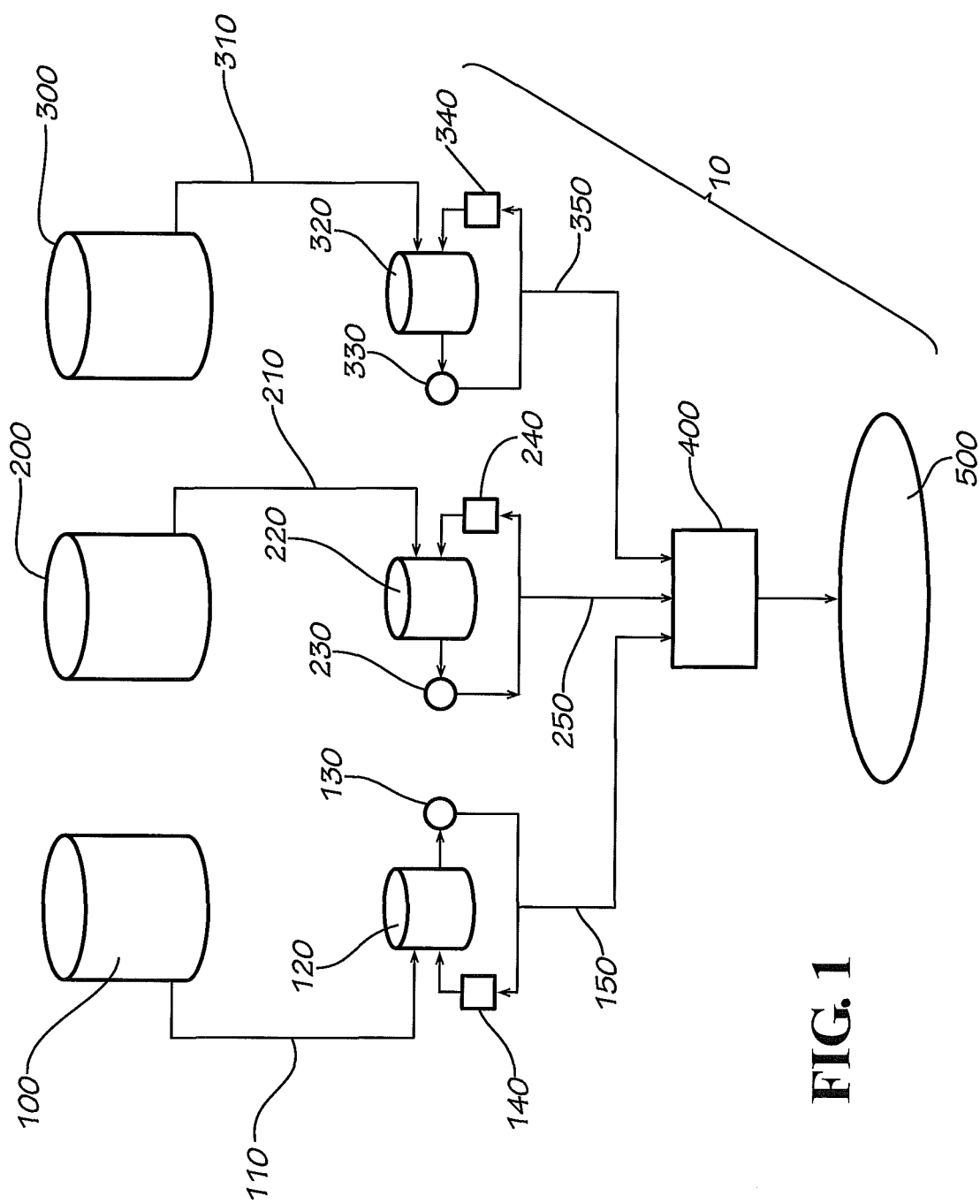
FIG. 1 is a schematic illustration of a polymer manufacturing process of a type disclosed herein for making foam work pieces.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1-4 and like reference numerals are being used consistently throughout to refer to like and corresponding parts of the invention for all of the various views and figures of the drawing.

One embodiment of the present technology comprising plant based oils teaches a novel foam cushion apparatus and method for making foam with starting materials containing plant based components.

The details of the invention and various embodiments can be better understood by referring to the figures of the drawing. Referring to FIG. 1, a schematic illustration is provided of a polymer manufacturing process 10 of a type disclosed herein for making foam work pieces 600.

In a typical polymer production process bulk storage of the constituent components are fed to smaller holding chambers from which the constituents are drawn in relevant proportion to be reacted with one another to form the polymer. The resulting polymer is then molded and further processed as necessary. In such a process, polymer is the reaction product of petroleum isocyanates and polyols. Additives are frequently provided as well.

While polyurethane polymers are used for a vast array of applications, their production method can be broken into three distinct phases. First, the bulk polymer product is made. Next, the polymer is exposed to various processing steps. Finally, the polymer is transformed into its final product and shipped. This production process can be illustrated by looking at the continuous production of polyurethane foams.

At the start of polyurethane foam production, the reacting raw material constituents are generally held as liquids in large, stainless steel tanks. These tanks are equipped with agitators to keep the materials fluid. A metering device is attached to the tanks so that the appropriate amount of reactive material can be pumped out. A typical ratio of polyol to diisocyanate is 1:2. Since the ratio of the component materials produces polymers with varying characteristics, it is strictly controlled.

The reacting materials are passed through a heat exchanger as they are pumped into pipes. The exchanger adjusts the temperature to the reactive level. Inside the pipes, the polymerization reaction occurs. By the time the polymerizing liquid gets to the end of the pipe, the polyurethane is already formed. On one end of the pipe is a dispensing head for the polymer.

The dispensing head is hooked up to the processing line. For the production of rigid polyurethane foam insulation, a roll of baking paper is spooled at the start of the processing line. This paper is moved along a conveyor and brought under the dispensing head.

As the paper passes under, polyurethane is blown onto it. As the polymer is dispensed, it is mixed with carbon dioxide which causes it to expand. It continues to rise as it moves along the conveyor. After the expansion reaction begins, a second top layer of paper is rolled on. Additionally, side papers may also be rolled into the process. Each layer of paper contains the polyurethane foam giving it shape. The rigid foam is passed through a series of panels that control the width and height of the foam bun. As they travel through this section of the production line, they are typically dried. At the end of the production line, the foam insulation is cut with an automatic saw to the desired length. The foam bun is then conveyored to the final processing steps that include packaging, stacking, and shipping.

For flexible foam, instead of passing along a conveyor, the polymer is placed in a mold and shaped in large shapes for later processing.

Environmentally friendly vegetable oils can be a valuable source of polyols as well as a suitable substitute for isocyanates in the production of polymers. However the chemistry of some vegetable oils is better suited than others. In order to balance the desired functionality of some vegetable oils with the lower production cost of other vegetable oils; chemical synthesis has been performed on lower cost vegetable oils, with wider commercial availability, to obtain desirable functional groups. This has been performed by methods such as those disclosed in U.S. Pat. No. 7,893,287, which is incorporated in its entirety by this reference Disclosed herein is an illustrative manufacturing process 10 wherein there are three bulk storage containers. The first bulk storage container 100 contains a non-isocyanate resin, preferably from a plant source such as an epoxylated glyceride. Industrially suitable non-isocyanates are carbonates, which can be synthesized from plant-based oils through expoxylation. For example, cyclocarbonate oligomers can be synthesized as follows:

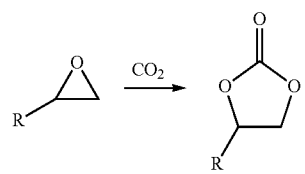

Carbonates may then be used to form hydroxyurethanes by the following method:

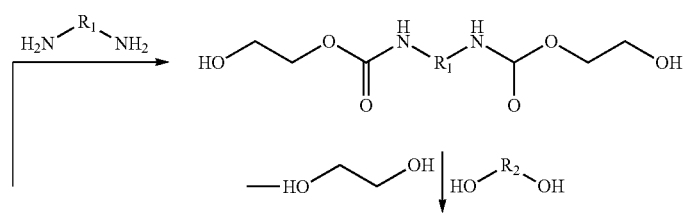

-continued

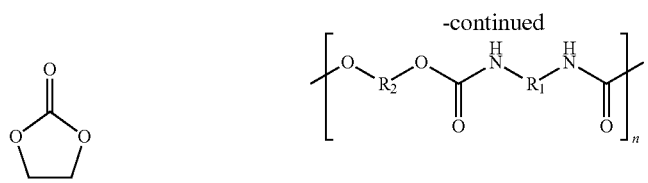

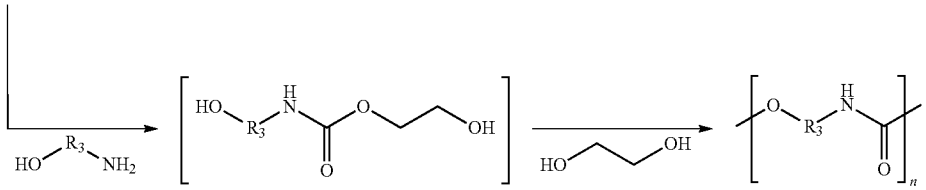

It may be appreciated by one of ordinary skill in the art, after being apprised of the present disclosure, that many other ways to prepare plant based carbonates with varying carbonate content. For example, carbonated vegetable oils may be produced in accordance with the teachings of U.S. Pat. No. 7,045,577, which is incorporated herein, in its entirety, by this reference.

The second bulk storage container 200 contains a polyol derived from a plant based oil such as a soybean oil, linseed oil, caster oil, etc. Illustrative polyols derived from plant based oils are disclosed in U.S. Pat. Nos. 7,674,925, 7,786, 239 and 8,153,746, which are incorporated herein in their entireties by this reference. Optionally, a third bulk storage container 300 contains an additive which could include a colorant (e.g., dyes, pigments, biological pigments, inks, paint, colored chemicals, food colorings and the like or combinations thereof), flame retardant (e.g., Minerals such as aluminium hydroxide ATH, magnesium hydroxide MDH, huntite and hydromagnesite, various hydrates, red phosphorus, and boron compounds, mostly borates; Organohalogen Compounds. These include organochlorines such as, chlorendic acid derivatives and chlorinated paraffins; organobromines such as decabromodiphenyl ether (decaBDE), deca-bromodiphenyl ethane (a replacement for decaBDE), polymeric brominated compounds such as brominated polystyrenes, brominated carbonate oligomers (BCGs), brominated epoxy oligomers (BEOs), tetrabromophthalic anyhydride, tetrabromobisphenol A (TBBPA) and hexabromocyclododecane (HBCD). Most but not all halogenated flame retardants are used in conjunction with a synergist to enhance their efficiency. Antimony trioxide is widely used but other forms of antimony such as the pentoxide and sodium antimonate are also used and Organophosphorus compounds such as organophosphates, tris(2,3-dibromopropyl) phosphate, TPP, RDP, BPADP, tri-o-cresyl phosphate, phosphonates such as DMMP and phosphinates. There is also an important class of flame retardants that contain both phosphorus and halogen, examples of such are the chlorophosphates like TMCP and TDCP), hardener or other desired additive conventional in the art. Alternatively, in lieu of or in addition to the additive, additional bulk storage containers (not shown) could be provided that contain an isocyanate or petroleum based polyols.

These bulk storage containers 100, 200 and 300 may then be connected to smaller feed containers 120, 220 and 320 via conduits 110, 210 and 310, respectively. The feed containers 120, 220 and 320 are preferably adapted with low pressure circulation pumps 130, 230 and 330, respectively. Moreover, the feed containers 120, 220 and 320 are also preferably adapted with heat exchangers 140, 240 and 340, respectively.

By means of the low pressure circulation pumps 130, 230 and 330 and the heat exchangers 140, 240 and 340, the constituents in the feed containers 120, 220 and 320 can be circulated in order to preserve their utility.

When the constituents of each of the feed containers 120, 220, and 320 are needed, they may be fed via conduits 150, 250 and 350 to a mixing chamber 400 where the constituents are reacted to form a reaction product. The reaction product is then translated to a mold/conveyer 500 for subsequent processing.

As discussed above, the manufacturing process 10 can be performed with or without the use of isocyanate as the electrophile and in the presence of petroleum based or petroleum free polyols. However, in an illustrative embodiment, the process 10 is performed with a constituent mixture having an electrophile constituent ratio range of at least about 10:1 to 0:1 isocyanate to non-isocyanate electrophile. In other words, the percentage of electrophile that is non-isocyanate can range preferably 1% to 100% and more preferably in the range of 20% to 100%.

The polyol constituents in manufacturing process 10 may or may not be petroleum based. However, in an illustrative embodiment, the process 10 is performed with a constituent mixture having a polyol constituent ratio range of at least about 10:1 to 0:1 petroleum to plant based polyol. In other words, the percentage of polyol that is non-petroleum based can range preferably 1% to 100% and more preferably in the range of 20% to 100%.

In an illustrative embodiment in accordance with manufacturing process 10, at least twenty percent (20%) of both the electrophile and polyol constituents are derived from plant based sources.

Example 1

| Component | Amount (in grams) |
| --- | --- |
| Soybean Oil | 309.60 |
| Iodine Crystal | 0.60 |
| Diethanolamine | 58.11 |
| Diphenylmethane diisocynate | 13.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 13 grams of diphenylmethane diisocyanate, yielding a soy polyurethane material.

Example 2

| Component | Amount (in grams) |
|---|---|
| Soybean Oil | 309.60 |
| Iodine Crystal | 0.60 |
| Diethanolamine | 58.11 |
| Dimethyl carbonate | 1.00 |
| Diphenylmethane diisocynate | 12.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 1 gram of Dimethyl carbonate and 12 grams of diphenylmethane diisocyanate, yielding a soy polyurethane material.

Example 3

| Component | Amount (in grams) |
|---|---|
| Soybean Oil | 309.60 |
| Iodine Crystal | 0.60 |
| Diethanolamine | 58.11 |
| Dimethyl carbonate | 3.00 |
| Diphenylmethane diisocynate | 10.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 3 grams of Dimethyl carbonate and 10 grams of diphenylmethane diisocyanate, yielding a soy polyurethane material.

Example 4

| Component | Amount (in grams) |
|---|---|
| Soybean Oil | 309.60 |
| Iodine Crystal | 0.60 |
| Diethanolamine | 58.11 |
| Dimethyl carbonate | 6.50 |
| Diphenylmethane diisocynate | 6.50 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 6.5 grams of Dimethyl carbonate and 6.5 grams of diphenylmethane diisocyanate, yielding a soy polyurethane material.

Example 5

| Component | Amount (in grams) |
|---|---|
| Soybean Oil | 309.60 |
| Iodine Crystal | 0.60 |
| Diethanolamine | 58.11 |
| Dimethyl carbonate | 10.00 |
| Diphenylmethane diisocynate | 3.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 10 gram of Dimethyl carbonate and 3 grams of diphenylmethane diisocyanate, yielding a soy polyurethane material.

Example 6

| Component | Amount (in grams) |
|---|---|
| Soybean Oil | 309.60 |
| Iodine Crystal | 0.60 |
| Diethanolamine | 58.11 |
| Dimethyl carbonate | 12.00 |
| Diphenylmethane diisocynate | 1.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 12 gram of Dimethyl carbonate and 1 gram of diphenylmethane diisocyanate, yielding a soy polyurethane material.

Example 7

| Component | Amount (in grams) |
|---|---|
| Soybean Oil | 309.60 |
| Iodine Crystal | 0.60 |
| Diethanolamine | 58.11 |
| Toluene diisocynate | 13.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 13 grams of Toluene diisocyanate, yielding a soy polyurethane material.

Example 8

| Component | Amount (in grams) |
| --- | --- |
| Soybean Oil | 309.60 |
| Iodine Crystal | 0.60 |
| Diethanolamine | 58.11 |
| Dimethyl carbonate | 1.00 |
| Toluene diisocynate | 12.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 1 gram of Dimethyl carbonate and 12 grams of Toluene diisocyanate, yielding a soy polyurethane material.

Example 9

| Component | Amount (in grams) |
| --- | --- |
| Soybean Oil | 309.60 |
| Iodine Crystal | 0.60 |
| Diethanolamine | 58.11 |
| Dimethyl carbonate | 3.00 |
| Toluene diisocynate | 10.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 3 grams of Dimethyl carbonate and 10 grams of Toluene diisocyanate, yielding a soy polyurethane material.

Example 10

| Component | Amount (in grams) |
| --- | --- |
| Soybean Oil | 309.60 |
| Iodine Crystal | 0.60 |
| Diethanolamine | 58.11 |
| Dimethyl carbonate | 6.50 |
| Toluene diisocynate | 6.50 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 6.5 grams of Dimethyl carbonate and 6.5 grams of Toluene diisocyanate, yielding a soy polyurethane material.

Example 11

| Component | Amount (in grams) |
| --- | --- |
| Soybean Oil | 309.60 |
| Iodine Crystal | 0.60 |
| Diethanolamine | 58.11 |
| Dimethyl carbonate | 10.00 |
| Toluene diisocynate | 3.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 10 gram of Dimethyl carbonate and 3 grams of Toluene diisocyanate, yielding a soy polyurethane material.

Example 12

| Component | Amount (in grams) |
| --- | --- |
| Soybean Oil | 309.60 |
| Iodine Crystal | 0.60 |
| Diethanolamine | 58.11 |
| Dimethyl carbonate | 12.00 |
| Toluene diisocynate | 1.00 |

The above amounts of diethanolamine and iodine are added to the above amount of soybean oil with stirring. The mixture is stirred for 18 hours at between about 195° F. (90° C.) and about 236° F. (113° C.), then cooled to room temperature to give soy polyol. An amount of 30.82 grams of the polyol is then reacted with 12 gram of Dimethyl carbonate and 1 gram of toluene diisocyanate, yielding a soy polyurethane material.

Example 13

| Component | Amount (in grams) |
| --- | --- |
| Sunflower Oil | 300.00 |
| Iodine | 1.00 |
| Diethanolamine | 26.29 |
| Dimethyl carbonate | 7.50 |

The above amounts of diethanolamine and iodine are added to the above amount of sunflower oil with stirring. The mixture is stirred for 23 hours at between about 180° F. (82° C.) and about 210° F. (98° C.), then cooled to room temperature to give sunflower polyol. An amount of 31 grams of the polyol is then reacted with 7.5 gram of Dimethyl carbonate, yielding a sunflower polyurethane material.

Example 14

| Component | Amount (in grams) |
| --- | --- |
| Sunflower Oil | 300.00 |
| Iodine | 1.00 |
| Diethanolamine | 26.29 |
| Dimethyl carbonate | 3.25 |
| Toluene diisocynate | 3.25 |

The above amounts of diethanolamine and iodine are added to the above amount of sunflower oil with stirring. The mixture is stirred for 23 hours at between about 180° F. (82° C.) and about 210° F. (98° C.), then cooled to room temperature to give sunflower polyol. An amount of 31 grams of the polyol is then reacted with 3.25 gram of Dimethyl carbonate and 3.25 gram of toluene diisocyanate, yielding a sunflower polyurethane material.

Example 15

| Component | Amount (in grams) |
| --- | --- |
| Linseed Oil | 300.00 |
| Iodine | 1.00 |
| Diethanolamine | 26.29 |
| Dimethyl carbonate | 8.00 |

The above amounts of diethanolamine and iodine are added to the above amount of linseed oil with stirring. The mixture is stirred for 23 hours at between about 180° F. (82° C.) and about 210° F. (98° C.), then cooled to room temperature to give sunflower polyol. An amount of 31 grams of the polyol is then reacted with 8 grams of Dimethyl carbonate, yielding a linseed polyurethane material.

Example 16

| Component | Amount (in grams) |
| --- | --- |
| Linseed Oil | 300.00 |
| Iodine | 1.00 |
| Diethanolamine | 26.29 |
| Dimethyl carbonate | 3.25 |
| Toluene diisocynate | 3.25 |

The above amounts of diethanolamine and iodine are added to the above amount of linseed oil with stirring. The mixture is stirred for 23 hours at between about 180° F. (82° C.) and about 210° F. (98° C.), then cooled to room temperature to give sunflower polyol. An amount of 31 grams of the polyol is then reacted with 3.25 gram of Dimethyl carbonate and 3.25 gram of toluene diisocyanate, yielding a linseed polyurethane material.

Example 17

| Component | Amount (in grams) |
| --- | --- |
| Caster Oil | 300.00 |
| Iodine | 1.00 |
| Diethanolamine | 26.29 |
| Dimethyl carbonate | 7.50 |

The above amounts of diethanolamine and iodine are added to the above amount of caster oil with stirring. The mixture is stirred for 23 hours at between about 180° F. (82° C.) and about 210° F. (98° C.), then cooled to room temperature to give sunflower polyol. An amount of 31 grams of the polyol is then reacted with 7.5 grams of Dimethyl carbonate, yielding a caster polyurethane material.

Example 18

| Component | Amount (in grams) |
| --- | --- |
| Caster Oil | 300.00 |
| Iodine | 1.00 |
| Diethanolamine | 26.29 |
| Dimethyl carbonate | 3.25 |
| Toluene diisocynate | 3.25 |

The above amounts of diethanolamine and iodine are added to the above amount of caster oil with stirring. The mixture is stirred for 23 hours at between about 180° F. (82° C.) and about 210° F. (98° C.), then cooled to room temperature to give sunflower polyol. An amount of 31 grams of the polyol is then reacted with 3.25 grams of Dimethyl carbonate and 3.25 grams of toluene diisocyanate, yielding a caster polyurethane material.

Similar testing may be conducted on other plant based oils such as, corn, rapeseed, sunflower, sesame seed, peanut, safflower, olive, cotton, walnut, caster, etc. and mixtures thereof, to confirm suitability. Soybean oil, sunflower oil, linseed oil and caster oil have been selected as they represent the spectrum of least to greatest hydroxyl functionality and if/when carbonated have the least to greatest carbonate content.

It should be further pointed out that a purification step may be employed at varying stages to eliminate any odor commonly associated with vegetable oil polyols. Purification processes and odor testing may be conducted according to conventional protocols such as those disclosed in U.S. Pat. No. 7,893,287.

Figure 3:
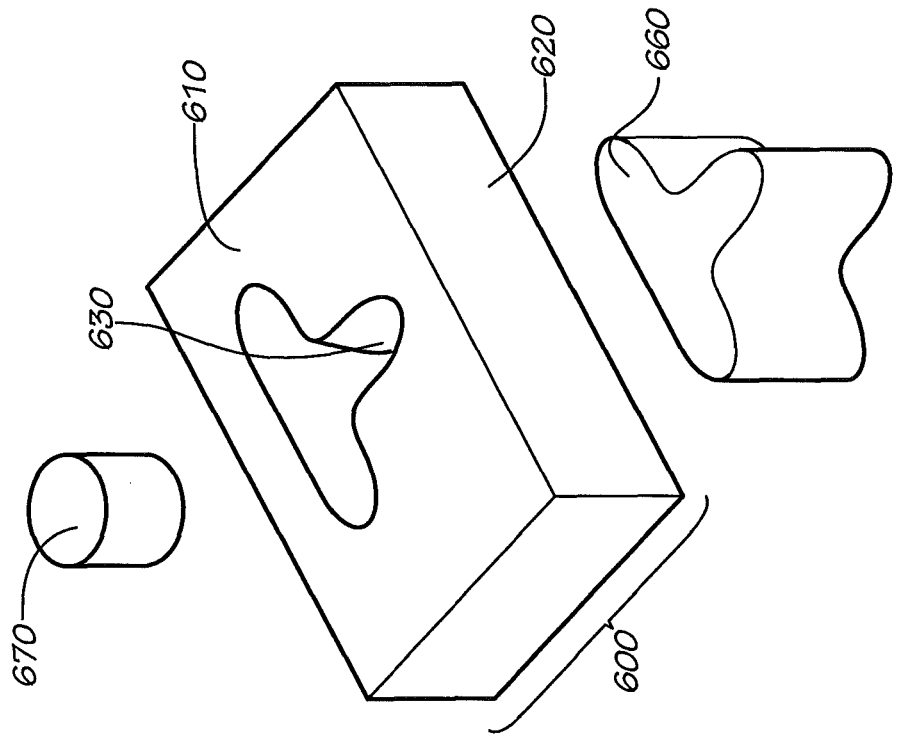
FIG. 3 is a perspective view of a surgical positioner typical of the type manufactured by a process disclosed herein suitable for surgical positioning applications with additional perspective view of alternative die for aperture formation.
Figure 2:
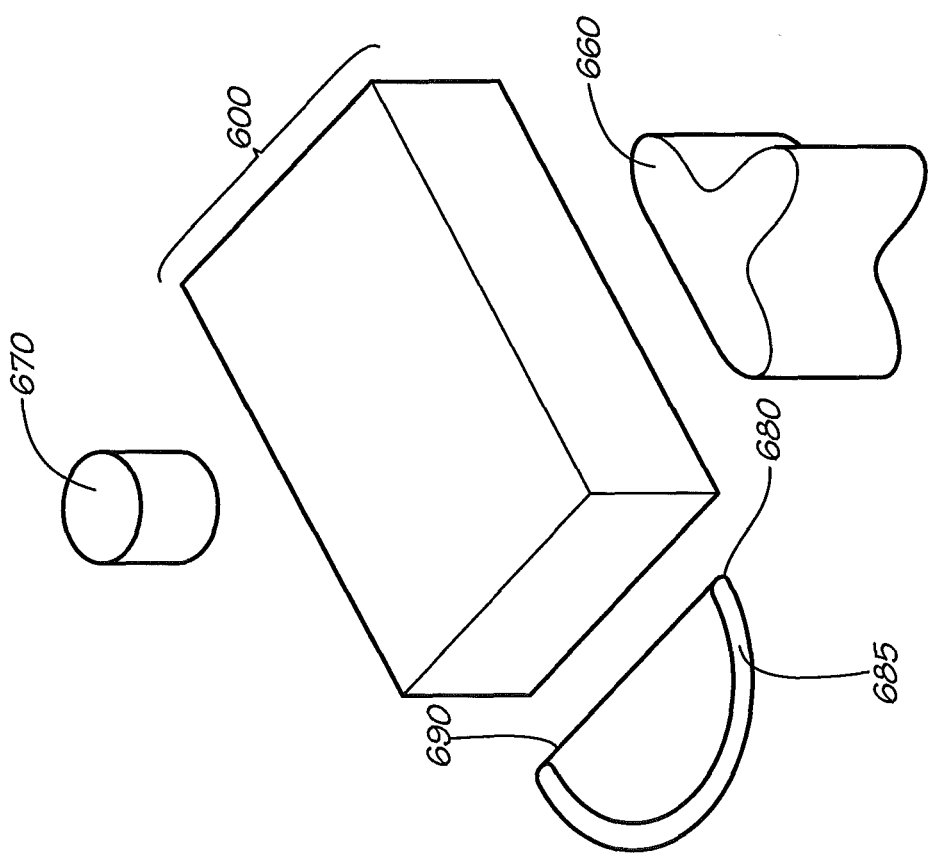
FIG. 2 is a perspective view of a foam work piece typical of the type manufactured by a process disclosed herein suitable for further processing into additional cushions of wide ranging commercial applications, the foam work piece further accompanied by additional perspective view of alternative die for aperture formation and illustrative cutting/shaping tool.

Once the reaction product is composed, it is either conveyed or molded. With specific reference being made to FIG. 2, a foam structure 600 is provided that can be formed into any shape and contour desired by the end user. Exemplary die 660 and 670 show possible shapes that can be formed in the foam structure 600. FIG. 3 illustrates a foam structure 600, wherein die 660 has been used to create an aperture In fact, two different reaction products, having differing characteristics such as flexibility and resilience, can be molded together to provide a foam structure 600, having a support portion 610 and a stabilizing portion 620, wherein the support portion 610 has a relatively different firmness than the stabilizing portion 620.

There are several processing tools and methods for forming and contouring a foam structure 600. For example, a hot wire 690 that can be guided by a user by holding the handle 685 may be used for gross remodeling as well as intricate detail. Other methods include but are not limited to multiple cavity, multiple layer die cut techniques, band saw foam cutting operations, foam splitter, jet cutting, laser cutting, CNC routing, thermoforming, profiling, slitting, etc.

The various manufacturing process examples shown above illustrate the process by which polyurethane may be manufactured as a reaction product of constituents derived at least in part from plant based sources. A user of the present technology may choose any of the above methods or constituent formulations, or an equivalent thereof, depending upon the desired application. In this regard, it is recognized that various forms of the subject methods could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Figure 4:
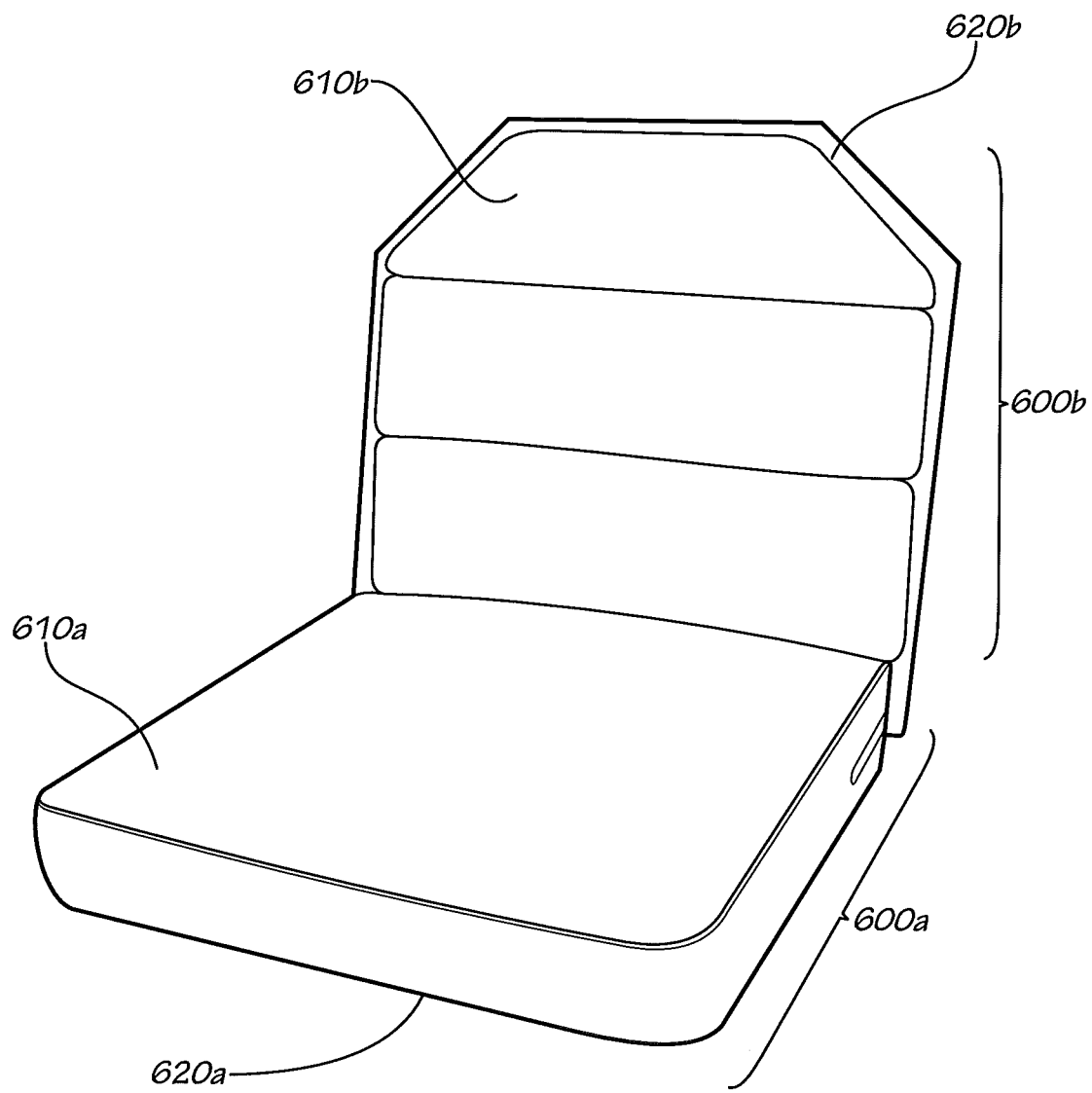
FIG. 4 is a perspective view of two foam work pieces typical of the type manufactured by a process disclosed herein further processed into integrated seat cushions.

Illustrative of foams disclosed herein, FIG. 4 shows foam structures 600a, 600b with support portions 610a, 610b and stabilizing portions 620a, 620b. The structures 600a, 600b are configured to form an exemplary seat cushion system adaptable to many consumer uses such as car seats. Below is a discussion of other industrial uses of Isocyanate Containing Polyurethane Foams. The intent is to describe potential uses while reminding the reader that these uses are available also with foam structures 600 disclosed herein with reduced toxicity resulting from lower isocyanate usage as well as the attenuation of odor, typically associated with vegetable based polyols.

Isocyanate Containing Flexible Polyurethane Foam (ICFPF) can be used as cushioning for a wide variety of consumer and commercial products including furniture, carpet cushion, transportation, bedding, packaging, textiles and fibers. Primary usage of flexible foam consists of slabstock, which is used primarily for carpet cushion and furniture. Most of the remainder is used by the transportation industry for automotive interiors and other purposes.

However, ICFPF may also be used for cushions in upholstered furniture, office chairs, stadium seating and auditorium seating. As a cushioning material, ICFPF provides, among other benefits, support and comfort, durability, resiliency, energy absorption and handling strength.

ICFPF can also improve the comfort and lifespan of carpet. By absorbing much of the energy from traffic, ICFPF protects the carpet face allowing the carpet to look better longer. Its design and construction provides long-term comfort without excessive thickness, maintaining the desired feel underfoot throughout the life of the installation. ICFPF is used in both residential and commercial applications, the majority of which is supplied by the bonded version of the cushion. Studies have repeatedly shown that polyurethane provides outstanding durability, improves carpet appearance retention, and provides comfort and support to occupants. It helps extend the life cycle extension of the carpet. Polyurethane carpet cushion helps absorb sound by as much as 50 percent—making the workplace quieter and a more productive place through reduced noise distraction, and less fatigue—and the compelling basis for including cushion in the carpet floor covering system is undeniable. There are also environmental benefits: in addition to the fact that bonded polyurethane cushion is made from recycled materials and can be recycled in many localities, the potential extension of carpet life can mean less frequent replacements, resulting in less carpet going to landfill. Some of the many benefits of polyurethane carpet cushion include: (1) extended carpet life—carpet cushion can improve the life expectancy of carpet by up to 50 percent; (2) Increased savings and reduced downtime due to less frequent replacement; (3) added comfort; (4) reduced ambient noise; (5) enhanced thermal insulation; (6) easier carpet maintenance; and (7) Recyclable in many localities.

ICFPFs are used extensively in the transportation industry for seating, headrests, arm rests, HVAC components, interior panels and skins, car and truck fenders, truck beds and support rings for run-flat tires, headliners and other interior systems. Recent developments in polyurethane technology for automotive design are contributing to increased weight reduction, passenger comfort, energy and sound absorption, resiliency, moisture and heat resistance, and compressive strength in vehicles. Polyurethane is increasingly valuable to original equipment manufacturers, also known as OEMs, because it simultaneously offers weight reduction, sound/vibration absorption, fuel efficiency and durability. All of these benefits translate to better gas mileage and a more comfortable ride.

ICFPFs are the primary material used today for adding support and comfort to padded bedding products. The industry has produced thicker and larger bedding products. This is evidenced by the increasing popularity of pillow-top mattresses. ICFPF are produced in slab or block form and cut to size. Because of its durable comfort and support, ease of fabrication, and adaptability to styling, ICFPFs become a major component in the bedding industry.

ICFPFs provides protection and cushioning to packaged products. Polyurethane foams are often used to package highly sensitive equipment such as electronics, printed circuit boards, jewelry and delicate foods. ICFPFs lightweight, water resistance, shock absorption and resiliency make it an attractive application for packaging.

ICFPFs continue to be used as insulation for fabric products including clothing. In clothing, ICFPF provides thermal insulation, tear resistance, fire resistance and light weight to a variety of textiles and fibers including leather products, shoe uppers, tents, life rafts, labels, hand bags, insulation liners and more.

By reducing or eliminating the carcinogenic constituents in flexible polyurethane foams by substituting plant based constituents, the consumer and commercial benefits of ICFPFs can be harnessed while reducing the environmental and public health impact caused by the use of these products.

The various commercial applications for plant based foam examples shown above illustrate the broad spectrum of utility polyurethane manufactured as a reaction product of constituents derived at least in part from plant based sources has in relation to consumer comfort applications. A user of the present technology may choose any of the above uses, or an equivalent thereof, depending upon the desired application. In this regard, it is recognized that various forms of the subject comfort apparatus could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

I claim:

1. An article of manufacture formed from a reaction product, the reaction product resulting from the reaction of at least two reactants, wherein at least one reactant is a non-epoxidized plant based polyol and at least one physically separate and distinct reactant is an isocyanate free monomer, comprising a flexible foam structure.

2. The article of manufacture of claim 1, further comprising and additive.

3. The article of manufacture of claim 2, wherein the additive is a flame retardant.

4. The article of manufacture of claim 1, wherein the isocyanate free monomer is a cyclic carbonate.

5. The article of manufacture of claim 1, wherein the polyol is soybean based.

6. The article of manufacture of claim 1, wherein the flexible foam structure is a mattress.

7. The article of manufacture of claim 1, wherein the flexible foam structure is a cushion selected from the group consisting of furniture padding, carpet cushion, transportation padding, bedding, packaging padding and shoe uppers.

8. The article of manufacture of claim 1, further comprising an isocyanate monomer.

9. The article of manufacture of claim 8, wherein the ratio of isocyanate to electrophilic monomer is at least about 10:1 to 1:1.

10. The article of manufacture of claim 8, wherein the ratio of electrophilic monomer to isocyanate is at least 10:1 to 1:1.

11. An article of manufacture, comprised of the reaction product of at least one plant based polyol and at one isocyanate free monomer, wherein said article of manufacture comprises at least about 20%, by weight, a reaction product of both a plant based polyol and a plant based isocyanate free monomer.

12. A method of manufacturing a product by reacting at least one non-epoxidized plant based polyol; at least one physically separate and distinct isocyanate free monomer and forming the reaction product into a foam structure.

13. The method of claim 12, further comprising an additive.

14. The method of claim 13, wherein the additive is a fire retardant.

15. The method of claim 11, wherein the isocyanate free monomer is a cyclic carbonate.

16. The method of claim 11, wherein the polyol is soybean based.

17. The method of claim 12, further comprising an isocyanate monomer.

18. The method of claim 17, wherein the ratio of isocyanate to electrophilic monomer is at least about 100:1 to about 1:1.

19. The method of claim 17, wherein the ratio of electrophilic monomer to isocyanate is at least 100:1 to 1:1.

20. The method of claim 12, wherein the product comprises at least about 20%, by weight, plant based polyol.

* * * * *